United States Patent Office 3,744,988
Patented July 10, 1973

3,744,988
TOBACCO SUCKER CONTROL
Eriks V. Krumkalns and Harold Melton Taylor, Indianapolis, Ind., assignors to Eli Lilly and Company, Indianapolis, Ind.
No Drawing. Application Oct. 16, 1969, Ser. No. 867,058, which is a continuation-in-part of application Ser. No. 785,737, Dec. 20, 1968, now abandoned. Divided and this application Dec. 23, 1971, Ser. No. 211,691
Int. Cl. A01n 5/00
U.S. Cl. 71—78                                11 Claims

ABSTRACT OF THE DISCLOSURE

Substituted 3-pyridylmethanes having the formula

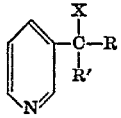

are applied to growing tobacco plants to inhibit the growth of laterals, or suckers, on such plants.

CROSS-REFERENCE

This application is a division of our copending application Ser. No. 867,058, filed Oct. 16, 1969, which, in turn, is a continuation-in-part of our then copending application Ser. No. 785,737, filed Dec. 20, 1968, now abandoned.

BACKGROUND OF THE INVENTION

In the prior art, D'Amico, U.S. 3,155,671 (Nov. 3, 1964) teaches the preparation of derivatives of 2-thiopyridine-1-oxide, which destroy or control undesired vegetation.

Johnson et al., Belgian 645,271 (Sept. 16, 1964), teach the use of 4-hydroxytrihalo (or tetrahalo) pyridines as herbicides. These pyridine compounds were applied to the foliage of cucumber plants and wild grass to kill the wild grass.

In addition, Kovikov et al., Khim v. Sel'sk. Khoz. 4 (6), 435–7 (1966), tested semi- and thiosemicarbazones of 2-, 3-, and 4-pyridinecarboxaldehyde and teach the thiosemicarbazone of 2-pyridinecarboxaldehyde as having the highest herbicidal activity.

Van Heyningen U.S. Pat. No. 3,396,224 discloses the use of 3-substituted pyridines similar to those of the present invention to control fungi on food crops and ornamental plants.

SUMMARY

We have now discovered that the growth of laterals, or suckers, on growing tobacco plants is inhibited by the application to such plants of an effective amount of a compound of the formula

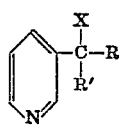

DESCRIPTION OF THE PREFERRED EMBODIMENT

The compounds employed in the novel process of this invention are substituted 3-pyridylmethanes having the following formula:

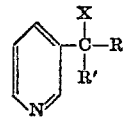

wherein

X is hydrogen, hydroxyl, $C_1$–$C_3$ alkoxy, amino, or cyano;
R is

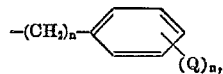

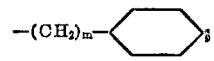

$C_1$–$C_6$ alkoxy,
$C_1$–$C_{12}$ alkyl,
$C_2$–$C_8$ alkenyl,
$C_2$–$C_8$ alkynyl,
$C_3$–$C_8$ cycloalkyl, or
$C_4$–$C_8$ cycloalkenyl;

R' is R, pyridyl, or thienyl;
  each Q independently is halo, nitro, $C_1$–$C_3$ alkyl, $C_1$–$C_3$ alkoxy, trifluoromethyl, $C_1$–$C_3$ alkylthio, $C_1$–$C_3$ alkyl-SO—, or $C_1$–$C_3$ alkyl-$SO_2$—, or two Q's taken together are methylenedioxy;
  each n independently is an integer of 0 to 3; and
  m is an integer of 1 to 3;

and the acid addition salts thereof.

In the process of this invention a composition containing one or more of the above-described pyridylmethanes is applied to growing tobacco plants to inhibit the growth of laterals, or suckers, on such plants.

While a number of substituents have been indicated for the phenyl groups in the above formula, it will be apparent to those skilled in the art that other substituents may also be used, and that substitution may occur on other than the phenyl groups. When there is more than one substituent present they may be the same or different. Compounds bearing such substituents are thus to be considered to be within the scope of this invention.

In the above formula, $C_1$–$C_6$ alkoxy can be, for example, methoxy, ethoxy, isopropoxy, butoxy, pentoxy, and hexoxy.

The $C_1$–$C_{12}$ alkyl groups can be, illustratively, methyl, ethyl, propyl, isopropyl, n-butyl, sec.-butyl, tert.-butyl, n-amyl, isoamyl, sec.-amyl, n-hexyl, isohexyl, sec.-hexyl, n-heptyl, isoheptyl, sec.-heptyl, n-octyl, sec.-octyl, iso-octyl, nonyl, decyl, undecyl, dodecyl, and the like.

$C_3$–$C_8$ cycloalkyl can be, illustratively, cyclopropyl, cyclobutyl, cyclopentyl, cyclohexy, cycoheptyl, and cyclooctyl.

The alkenyl and alkynyl groups can be such as vinyl, allyl, 1-butenyl, 2-pentenyl, 2-octenyl, 1-butynyl, 2-propynyl, 2-hexynyl, and 1-octynyl.

Suitable cycloalkenyl groups include cyclohexenyl, cyclopentenyl, cyclobutenyl, cyclooctenyl, and norbornenyl.

Halo includes chlorine, bromine, iodine, and fluorine.

The acid addition salts of the compounds represented by the generic formula supra are represented by those formed with hydrochloric, hydrobromic, hydriodic, sulfuric, nitric, p-toluenesulfonic, maleic, acetic, and malonic acids and the like.

Examples of compounds which have the desired activity and which can be successfully employed as tobacco desuckering agents in accord with the novel processes of this invention include, but are not limited to, the following:

3-[bis-(4-fluorophenyl)methyl]pyridine
α-(4-chlorophenyl)-α-cyclopropyl-3-pyridinemethanol
α,α-Bis(2-chlorophenyl)-3-pyridinemethanol hydrochloride
α-(2,4-dichlorophenyl)-α-(4-fluorophenyl)-3-pyridinemethanol hydrochloride
α-(4-fluorophenyl)-α-phenyl-3-pyridinemethanol hydrochloride
α,α-Bis(n-pentyl)-3-pyridinemethanol hydrochloride
α-(2-chlorophenyl)-α-(4-fluorophenyl)-3-pyridinemethanol hydrochloride
α-(n-hexyl)-α-methyl-3-pyridinemethanol
3-(1-isobutyl-3-methylbutyl)pyridine
α,α-Bis(isobutyl)-3-pyridinemethanol
α-(2,5-dimethylphenyl)-α-phenyl-3-pyridinemethanol hydrochloride
α-Chloro-α,α-bis-(4-chlorophenyl)-3-pyridylmethane hydrochloride
α,α-Bis-(4-chlorophenyl)-3-pyridylmethylamine hydrochloride
α,α-Bis-(4-chlorophenyl)-3-pyridylmethyl methyl ether
α-Cyclobutyl-α-(4-fluorophenyl)-3-pyridinemethanol
α-Pentafluorophenyl-α-phenyl-3-pyridinemethanol
3-(α-methyl-4-chlorobenzyl)pyridine hydrochloride
3-(dicyclohexylmethyl)pyridine
α,α-Bis(cyclohexyl)-3-pyridinemethanol
α,α-Bis(isopropyl)-3-pyridinemethanol
3[1-(n-heptyl)-n-octyl]pyridine
α,α-Bis(isopentyl)-3-pyridinemethanol hydrochloride
3-[α-cyclohexyl-α-(1-cyclohexenyl)methyl]pyridine
α,α-Bis(n-hexyl)-3-pyridinemethanol hydrochloride
α,α-Diphenyl-3-pyridineacetonitrile
α-(3-ethyl-n-pentyl)-α-isobutyl-3-pyridinemethanol hydrochloride
α,α-Bis(cyclopropyl)-3-pyridinemethanol hydrochloride
α,α-Bis(n-propyl)-3-pyridinemethanol hydrochloride
α,α-Bis(4-iodophenyl)-3-pyridylmethane p-toluenesulfonate
α-Phenyl-α-(4-chlorobenzyl)-3-pyridylmethane
α-Phenyl-α-(2-thienyl-3-pyridylmethane
α-(4-chlorophenyl)-α-(2-thienyl)-3-pyridylmethane maleate
α-(3,4-dichlorobenzyl)-α-(3-chlorophenyl)-3-pyridylmethane
α-(4-methylthiophenyl)-α-phenyl-3-pyridylmethane
3-(α-n-butylbenzyl)pyridine
α-(4-ethoxyphenyl)-α-phenyl-3-pyridylmethane hydrobromide
α,α-Bis(4-ethylphenyl)-3-pyridylmethane oxalate
α,α-Bis(4-nitrophenyl)-3-pyridylmethane
α-(3-bromophenyl)-α-phenyl-3-pyridylmethane sulfate
α,α-Bis(3-bromophenyl)-3-pyridylmethane nitrate
α-cyclopentyl-α-(4-chlorophenyl)-3-pyridylmethane
α-cyclohexyl-α-(3-bromophenyl)-3-pyridylmethane
α-(2-chlorobenzyl)-α-cyclooctyl-3-pyridylmethane
α-phenyl-α-(3-thienyl)-3-pyridylmethane
α-(4-chlorophenyl)-α-(2-pyridyl)-3-pyridylmethane
α-Cyano-α-phenyl-α-(3-thienyl)-3-pyridylmethane
Tri-(3-pyridyl)methane
α,α-Bis-(4-iodophenyl)-3-pyridinemethanol
α-(2-fluorophenyl)-α-phenyl-3-pyridinemethanol
α-Vinyl-α-phenyl-3-pyridinemethanol
α,α-Bis-(4-chlorophenyl)-3-pyridylmethyl acetate
α-Phenyl-β-(2-pyridyl)-α-(3-pyridyl)ethyl acetate
α-(4-bromophenyl)-α-phenyl-3-pyridinemethanol
α-(4-chlorobenzyl)-α-allyl-3-pyridinemethanol
α-(4-methyl-3-chlorophenyl)-α-(2-thienyl)-3-pyridinemethanol
α-(2-butenyl)-α-(4-methoxybenzyl)-3-pyridinemethanol
α-(4-iodobenzyl)-α-(4-pyridyl)-3-pyridinemethanol
α,α-Bis-(2-phenylethyl)-3-pyridinemethanol
α-n-Amyl-α-n-hexyl-3-pyridinemethanol
α,α-Bis(n-undecyl)-3-pyridinemethanol
α-n-Hexyl-α-n-heptyl-3-pyridinemethanol
α,α-Bis(cyclohexylmethyl)-3-pyridinemethanol hydrochloride
α-Isopentyl-α-isohexyl-3-pyridinemethanol hydrochloride
α-n-Undecyl-α-n-nonyl-3-pyridinemethanol sulfate
α,α-Bis(isopentyl)-3-pyridinemethanol hydrobromide
α-n-Dodecyl-α-n-octyl-3-pyridinemethanol phosphate
α,α-Bis(n-hexyl)-3-pyridinemethanol sulfate
α,α-Bis(n-undecyl)-3-pyridinemethanol phosphate
α,α-Bis(sec.-nonyl)-3-pyridinemethanol oxalate
α,α-Bis(n-dodecyl)-3-pyridinemethanol hydrochloride
α,α-Bis(undecyl)-3-pyridinemethanol hydrochloride
α,α-Bis(n-octyl)-3-pyridinemethanol hydrobromide, and the like.

The preferred compounds are those in which X in the above formula is hydrogen or hydroxyl.

The compounds are formulated for use either as dusts, spray concentrates, spreadable granules, or wettable powders. Those compounds which are soluble in water are readily formulated as emulsion-type sprays or wettable powders. Compounds which are less soluble in water are desirably formulated with a wetting agent or surfactant for the preparation of emulsion-type sprays or wettable powders. The wetting agent or surfactant used in formulating the emulsion-type sprays or wettable powders can be, illustratively, polyoxyethylene sorbitan monooleate, polyoxyethylene sorbitan monolaurate, polyglycol ether sulfonate, alkylamine dodecylbenzenesulfonate, and the like. In the preparation of spreadable granules, the solid diluent used can be calcined attapulgite clay. Dry dispersions can be prepared on inert carriers such as vermiculite, peat moss and the like.

The compounds useful in this invention are conveniently prepared by methods well known to the art. Thus, the 3-pyridylmethane derivatives are readily synthesized by the methods taught by Van Heyningen et al., U.S. 3,397,273 (Aug. 13, 1968); and the 3-pyridinemethanols and derivatives thereof are made available by methods taught by Van Heyningen, U.S. 3,396,224 (Aug. 6, 1968). In particular, the α,α-dialkyl-substituted 3-pyridinemethanols are prepared according to the teaching of Wibaut et al., Rec. Trav. Chim., 77, 1057, (1958). Those compounds wherein X is $C_1$–$C_3$ alkoxy, amino or cyano are prepared by methods disclosed in Belgian Pat. 714,003 and South African Pat. 68/2,417 for the preparation of analogous pyrimidine compounds.

To control the growth of suckers on tobacco plants the compounds described herein are applied to growing tobacco plants at a rate of 0.125 to 2 pounds per acre. For such application the compounds are formulated into sprays or wettable powders as described above and applied to the foliage of the plants. We have seen no injury to the tobacco plants at the rates used. The inhibition of sucker growth will be illustrated by the following example.

Example

Growing tobacco plants were topped, suckers over one inch in length were removed, and each plant was sprayed with 20 ml. of a formulation containing the concentration of the test compound indicated in parts per million. The suckers on the plants were measured, and the growth of suckers on treated plants were compared to growth on untreated controls. One, two, or three comparisons were made at intervals of one to two weeks. In some cases, after the third measurement the suckers were removed, weighed, and the weights of suckers from treated plants compared with the weights of suckers from control plants. The percent of inhibition was then calculated from the following formula.

Percent inhibition $$= \frac{\text{control measurement} - \text{treated measurement}}{\text{control measurement}} \times 100$$

The results are summarized in the table.

TABLE I
Tobacco Sucker Control

| Compound | Conc., p.p.m. | Percent inhibition 1 | 2 | 3 | Weight |
|---|---|---|---|---|---|
| 3-(2,2'-dichlorophenylmethyl) pyridine | 1,000 | 51.6 | 36 | 75.9 | 57.4 |
|  | 1,800 | 70 | 44 | 86.8 | 92 |
|  | 2,500 | 80 | 50 | 98.8 | 99.9 |
|  | 3,600 | 87.8 | 70 | 88 | 88.6 |
|  | 5,000 | 91.9 | 76 | 99.9 | 98.8 |
| 3-[1-(2-chlorophenyl)-n-heptyl]-pyridine | 500 | 30.1 | 51.9 |  | 15.6 |
|  | 1,000 | 35.5 | 45.6 |  | 19.3 |
|  | 2,000 | 78.6 | 77.0 |  | 62.1 |
|  | 500 | 27.2 | 24.7 | 0 |  |
| 3-[α-(n-pentoxy)benzyl]pyridine | 1,000 | 24.5 | 13.2 | 14.5 |  |
|  | 2,000 | 43.9 | 41.4 | 43.5 |  |
| 2-(2-chloro-α-cyclohexylbenzyl) pyridine | 500 | 10.6 | 7.8 |  |  |
|  | 1,000 | 14.1 | 8.7 |  |  |
|  | 2,000 | 10.1 | 8.3 |  |  |
|  | 500 | 9.5 | 0 | 0 |  |
| 4-(4-pyridyl)heptanol-4 | 1,000 | 18.1 | 2.7 | 36.6 |  |
|  | 2,000 | 18.1 | 4.0 | 87.2 |  |
| α,α-Bis(n-pentyl)-4-pyridine-methanol | 500 | 0 | 0 | 0 |  |
|  | 1,000 | 30.3 | 1.0 | 57.6 |  |
|  | 2,000 | 7.7 | 1.3 | 35.7 |  |
| α-(4-chlorophenyl)-α-(2,4-dichloro-benzyl)-3-pyridinemethanol sulfate | 500 | 0 | 0 | 0 |  |
|  | 1,000 | 42.5 | 53.8 | 58.8 |  |
|  | 2,000 | 0 | 9.7 | 0 |  |
| α-Cyclobutyl-α-(4-fluorophenyl)-3-pyridine methanol | 500 | 50.1 | 52.7 | 81.6 |  |
|  | 1,000 | 78.6 | 83.2 | 64.7 |  |
|  | 2,000 | 70.9 | 76.8 | 79.1 |  |
|  | 500 | 49.4 | 25.2 | 0 |  |
| 3-(1,2-diphenylethyl)-pyridine | 1,000 | 58.2 | 63.7 | 55·2 |  |
|  | 2,000 | 47.5 | 65.8 | 47.7 |  |
| 2-(2,5-dimethylphenyl)-α-phenyl-3-pyridine methanol hydrochloride | 2,000 | 55.4 | 77.9 | 87.1 | 94 |
|  | 4,000 | 71.4 | 38.4 | 27.9 | 37.4 |
| 2-(3-pyridyl)-1-(4-chlorophenyl)-2-propanol | 500 | 55 |  |  |  |
|  | 1,000 | 19 |  |  |  |
|  | 2,000 | 35 |  |  |  |
| α-(n-Pentyl)-α-phenyl-3-pyridinemethanol hydrochloride | 2,000 | 43.1 | 35.5 | 28.5 | 47.6 |
|  | 4,000 | 89.2 | 74.2 | 68.1 | 92 |
| α,α-Bis(cyclohexyl)-3-pyridinemethanol | 2,000 | 91.1 | 90.2 | 81.1 | 91.9 |
|  | 4,000 | 79.3 | 67.2 | 70.3 | 85 |
| 3-pyridyl-4-chlorophenyl-4-chlorobenzylcarbinol | 500 | 60.6 | 96.6 |  |  |
|  | 1,000 | 27.6 | 26.1 |  |  |
|  | 2,000 | 0 | 0 |  |  |
| α-(4-chlorophenyl)-α-cyclopropyl-3-pyridinemethanol hydrochloride | 2,000 | 91.1 | 90.2 | 85.6 | 91.4 |
|  | 4,000 | 93.9 | 100 | 100 | 100 |
| 3-pyridyldiphenylmethane | 500 | 30.8 | 30.6 | 0 |  |
|  | 1,000 | 45.3 | 44.6 | 2.8 |  |
|  | 2,000 | 75.1 | 78.6 | 56.9 |  |
| 3-[α-(2,5-dimethylphenyl)-benzyl]-pyridine | 2,000 | 93.9 | 98.4 | 99.1 | 99.7 |
|  | 4,000 | 88.2 | 95.1 | 97.3 | 99.5 |
| α-(2-chlorophenyl)-α-cyclohexyl-2-pyridinemethanol | 500 | 51.3 | 48.6 | 56.2 |  |
|  | 1,000 | 74.7 | 56.1 | 61.4 |  |
|  | 2,000 | 0 | 0 | 0 |  |
| 3-[bis(4-chlorophenyl)methyl]-pyridine hydrochloride | 500 | 0 |  |  |  |
|  | 1,000 | 91.4 |  |  |  |
|  | 2,000 | 20 |  |  |  |
| Bis(4-chlorophenyl)-3-pyridylmethane | 500 | 0 | 0 |  |  |
|  | 1,000 | 13.4 | 80.7 |  |  |
|  | 2,000 | 74 | 85.2 |  |  |
| 3-bis(2,5-dichlorophenyl)-methylpyridine | 500 | 51.4 | 100 |  |  |
|  | 1,000 | 43.2 | 56.8 |  |  |
|  | 2,000 | 100 | 100 |  |  |
| 3-dicyclohexylmethylpyridine | 500 | 0 |  |  |  |
|  | 1,000 | 0 |  |  |  |
|  | 2,000 | 94.1 |  |  |  |

It will be noted that 3-(2,2'-dichlorodiphenylmethyl) pyridine is an especially active compound. Its activity is somewhat different from presently-used tobacco desuckering agents in that it appears not only to depress the formation of new suckers, but also removes small suckers as well.

In addition to the above-described herbicidal and tobacco desuckering activity, the pyridine compounds described herein have been found to exhibit general plant growth inhibiting activity, especially with regard to foliar growth. For example, the application of 3-(2,2'-dichlorodiphenyl)pyridine to blue grass at a rate of 0.4 to 10 lbs./acre retards the growth of the grass leaves, thereby requiring less frequent mowing. The application of α-(4-chlorophenyl)-α-cyclopropyl-3-pyridinemethanol to mature soybeans at a rate of 0.4 to 10 lbs./acre retards foliar growth, permitting the plant to devote all its energy to fruit growth.

In general, application of the compounds may be as a foliar spray or a soil drench using techniques well known to those skilled in the art. At times, treatment may be effected by a seed soak treatment. In this method of treatment the seeds to be treated are allowed to stand in a solution of the compound for a period of several hours. The solution is prepared by dissolving the compound in an inert solvent such as acetone and diluting to the desired concentration with water containing a surface active agent.

We claim:

1. A method for inhibiting sucker growth to tobacco plants which comprises applying to growing tobacco plants an effective amount of a compound of the formula:

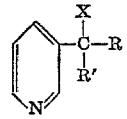

wherein
X is hydrogen, hydroxyl, $C_1$-$C_3$ alkoxy, amino, or cyano;
R is

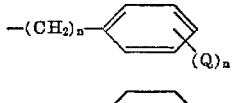

$C_1$-$C_6$ alkoxy,
$C_1$-$C_{12}$ alkyl,
$C_2$-$C_8$ alkenyl,
$C_2$-$C_8$ alkynyl,
$C_3$-$C_8$ cycloalkyl, or
$C_4$-$C_8$ cycloalkenyl;
R' is R, pyridyl, or thienyl;
each Q independently is halo, nitro, $C_1$-$C_3$ alkyl, $C_1$-$C_3$ alkoxy, trifluoromethyl, $C_1$-$C_3$ alkylthio, $C_1$-$C_3$ alkyl-SO—, or $C_1$-$C_3$ alkyl-SO$_2$—, or two Q's taken together are methylenedioxy;
each $n$ independently is an integer of 0 to 3; and
$m$ is an integer of 1 to 3;
and the acid addition salts thereof.

2. A method as in claim 1 wherein the compound is applied to the plants at a rate between about 0.125 and 2 pounds per acre.

3. A method as in claim 1 wherein X is hydrogen.

4. A method as in claim 3 wherein the compound is 3-(2,2'-dichlorodiphenylmethyl)pyridine.

5. A method as in claim 3 wherein the compound is 3-[α-(2,5-dimethylphenyl)benzyl]pyridine.

6. A method as in claim 3 wherein the compound is 3-bis(2,5-dichlorophenyl)methylpyridine.

7. A method as in claim 1 wherein X is hydroxyl.

8. A method as in claim 7 wherein the compound is α-cyclobutyl-α-(4-fluorophenyl)-3-pyridinemethanol.

9. A method as in claim 7 wherein the compound is α-(2,5-dimethylphenyl)-α-phenyl-3-pyridinemethanol hydrochloride.

10. A method as in claim 7 wherein the compound is α,α-bis(cyclohexyl)-3-pyridinemethanol.

11. A method as in claim 7 wherein the compound is α-(4-chlorophenyl)-α-cyclopropyl-3-pyridinemethanol hydrochloride.

References Cited
UNITED STATES PATENTS 3,545,955  12/1970  George _____ 71—76
3,396,224  8/1968  Van Heyningen _____ 424—275

OTHER REFERENCES

Novikov et al.: Chem. Abst., vol. 61 (1964), 8829d.
Milch; Chem. Abst., vol. 57 (1962), 1316f.

LEWIS GOTTS, Primary Examiner
C. L. MILLS, Assistant Examiner